(12) United States Patent
Blaude et al.

(10) Patent No.: US 7,598,312 B2
(45) Date of Patent: Oct. 6, 2009

(54) PROCESS FOR PREPARING A HALOGENATED POLYMER AND DEVICE FOR ITS IMPLEMENTATION

(75) Inventors: Jean-Marie Blaude, Brussels (BE); Roland Martin, St-Stevens-Woluwe (BE)

(73) Assignee: Solvay (Société Anonyme), Brussels (BE)

( * ) Notice: Subject to any disclaimer, the term of this patent is extended or adjusted under 35 U.S.C. 154(b) by 262 days.

(21) Appl. No.: 11/484,722

(22) Filed: Jul. 12, 2006

(65) Prior Publication Data
US 2007/0021570 A1  Jan. 25, 2007

(30) Foreign Application Priority Data
Jul. 15, 2005  (FR) .................................. 05 07560

(51) Int. Cl.
*C08L 27/12* (2006.01)
(52) U.S. Cl. ................ 524/544; 524/424; 524/545; 524/546; 526/68; 526/71; 526/242; 526/243; 526/244; 526/245; 526/344
(58) Field of Classification Search ................. 526/242, 526/942
See application file for complete search history.

(56) References Cited

U.S. PATENT DOCUMENTS

| 3,841,381 | A | * | 10/1974 | Dassesse et al. | ............. 159/2.1 |
| 5,674,957 | A | | 10/1997 | DeSimone et al. | |
| 6,790,934 | B2 | * | 9/2004 | Johnson et al. | ............. 528/499 |
| 6,806,332 | B2 | * | 10/2004 | Royer et al. | ................. 526/242 |

FOREIGN PATENT DOCUMENTS

| WO | WO 98/28351 | 7/1998 |
| WO | WO 01/34667 | 5/2001 |

OTHER PUBLICATIONS

Perry's Chemical Engineers' Handbook, Sixth Edition, Robert H. Perry, et al., Mc. Graw-Hill Book Company, 1984, pp. 17-51 to 17-54.

* cited by examiner

*Primary Examiner*—Marc S Zimmer
*Assistant Examiner*—Nicole M Buie
(74) *Attorney, Agent, or Firm*—Oblon, Spivak, McClelland, Maier & Neustadt, L.L.P.

(57) ABSTRACT

A process for preparing a halogenated polymer in a medium comprising liquid or supercritical carbon dioxide, comprising a step involving the radical polymerization of at least one halogenated monomer and at least one step involving cross-flow filtration; and a cross-flow filtration device.

18 Claims, 2 Drawing Sheets

PROCESS FOR PREPARING A HALOGENATED POLYMER AND DEVICE FOR ITS IMPLEMENTATION

CROSS REFERENCE TO RELATED APPLICATIONS

This application is based on and claims the benefit of priority of French Patent Application No. 05.07560, filed Jul. 15, 2005, which is hereby incorporated by reference in its entirety.

BACKGROUND OF THE INVENTION

1. Field of the Invention

The present invention relates to a process for preparing halogenated polymers and to a device for its implementation.

2. Description of the Related Art

Processes for the preparation of halogenated polymers in a medium comprising liquid or supercritical carbon dioxide generally may require high working pressures, in order to ensure the temperature and the density that are necessary for polymerization reactions. These process may also generally require low degrees of conversion, in order to ensure a moderate solids content guaranteeing free flow of the polymer suspension towards the outlet of the reactor. The latter requirement may be incorporated because of the high porosity of crystalline or semicrystalline polymers, which often results from their precipitation under conditions of very low solubility in liquid or supercritical carbon dioxide.

Various processes for preparing halogenated polymers and, in particular, fluoropolymers in liquid or supercritical carbon dioxide have been proposed. For instance, U.S. Pat. No. 5,674,957 describes the preparation of fluoropolymers by the polymerization of fluoromonomers in carbon dioxide in the presence of initiators capable of forming stable chain ends on the fluoropolymers. This polymerization is optionally followed by a step of separating the polymer formed, involving the complete decompression to atmospheric pressure of the polymerization medium and the recovery of the polymer by physical separation. Optionally, the polymer is washed before being processed.

WO 98/28351 describes a process for polymerizing fluoromonomers in a medium comprising liquid or supercritical carbon dioxide in a pressurized reactor and the recovery of the fluoropolymer by flash decompression of the polymerization medium extracted from said reactor. After having been recovered, the polymer obtained is optionally subjected to a subsequent heat treatment before processing, in order to remove therefrom the potentially gas-generating compounds.

One of the drawbacks of these processes is that all of the carbon dioxide and of the unconverted monomers accompanying the polymer to the outlet of the reactor is expanded, either by flash decompression or by complete decompression to atmospheric pressure, and therefore that the recycled fraction of this carbon dioxide and of these unconverted monomers must be returned to the polymerization pressure by compression and/or by condensation and pumping, these operations penalizing the cost-effectiveness of the process because of their energy cost. Another drawback of these processes is that they do not provide for the purification of the polymers during their formation and it is then necessary to subject them to a treatment before they are processed.

WO 01/34667 presents a continuous process for polymerization in a medium comprising liquid or supercritical carbon dioxide in a pressurized reactor, with separation of the carbon dioxide and unconverted monomers of the polymer at a pressure close to the reaction pressure, the solid polymer being retained in the separator while the carbon dioxide and the unconverted monomers are recycled back to the reactor. In the preferred device for separating the polymer, this operation is carried out by accumulation of the solid polymer in filters operating in alternating accumulation/discharge cycles.

One of the drawbacks of this process is the difficulty of dislodging the solid polymer from the filter where it has accumulated, with the consequent risks of total or complete blockage, long residence time of certain polymer fractions, perturbations in the polymerization and the separation conditions, which may lead to certain fractions of the production being outside the quality standard. Another drawback of this process is the cost of the separation equipment and of the equipment for controlling the accumulation/discharge cycles needed to separate the solid particles.

SUMMARY OF THE INVENTION

The objective of the present invention is therefore to remedy these limitations by proposing a novel process for preparing halogenated polymers in a medium comprising liquid or supercritical carbon dioxide and a device for implementing it.

Consequently, the present invention relates to a process for preparing halogenated polymers in a medium comprising liquid or supercritical carbon dioxide, characterized in that it comprises a step involving the radical polymerization of halogenated monomers and at least one step involving cross-flow filtration.

DETAILED DESCRIPTION OF THE PREFERRED EMBODIMENTS

A more complete appreciation of the present invention and many of the attendant advantages thereof will be readily obtained as the same becomes better understood by reference to the following detailed description when considered in connection with the accompanying drawings.

For the purpose of the present invention, the terms "monomers", "initiators", "additives", and "polymers" should be understood to be both in the singular and in the plural.

Cross-flow filtration is understood for the purpose of the present invention to mean any filtration during which the flow of the suspension to be filtered is substantially tangential to the filtration surface. Cross-flow filtration is, for example, described in the work entitled "Perry's Chemical Engineers' Handbook" Sixth Edition, Robert H. Perry and Don W. Green, McGraw-Hill Book Company, 1984, pages 17-51 to 17-54.

Cross-flow filtration is distinguished in particular from conventional filtration processes which operate with the flow of the suspension to be filtered directed so as to be approximately perpendicular to the filtration surface. The suspension flowlines make an angle of greater than 45°, preferably greater than 60°, and more preferably greater than 75° to the filtration surface. In general, in conventional filtration processes, the suspension flowlines make an angle of 90° to the filtration surface (flowlines perpendicular to the filtration surface).

In conventional filtration, if the pressure differential is kept constant, the filtration rate generally decreases over the course of time. This effect is due in general to the increase in resistance to the passage of the fluid through the increasing thickness of the particles retained on the filtration surface.

In contrast, in cross-flow filtration, the suspension flow is substantially parallel to the filtration surface—the suspension flowlines make an angle of less than 45°, preferably less than 30°, and more preferably less than 15° to the filtration surface. In one preferred embodiment, the suspension flowlines make an angle of 0° to the filtration surface (flowlines parallel to the filtration surface).

In particular, in cross-flow filtration the suspension flow rate advantageously makes it possible if not to completely remove, then at least to minimize the accumulation of solid particles on the filtration surface. In general, a polymer particle thickness forms on the filtration surface—such a thickness, which is particularly dependent on the particle concentration of the suspension, on the pressure differential and on the tangential velocity of the suspension flow, typically remains approximately constant over the course of time.

This makes it possible in particular to use cross-flow filtration under substantially steady-state conditions and advantageously to obtain a substantially constant flow of the fluid phase passing through the filtration surface, namely with variations of less than 30% with respect to the mean value.

Figure 1:
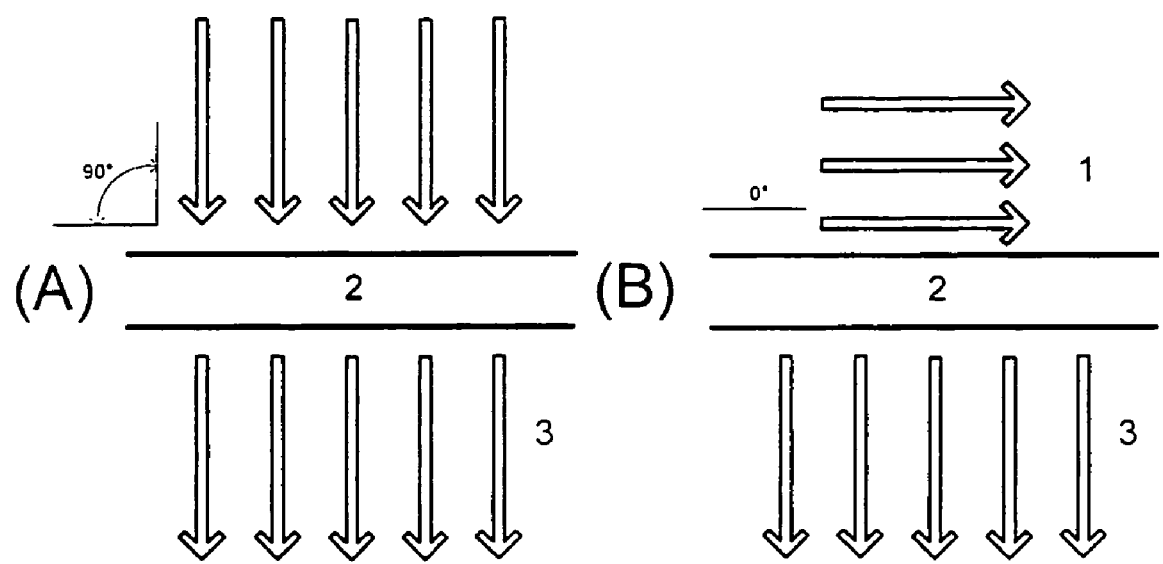
FIG. 1 represents a schematic illustration of the operation of conventional filtration.

FIG. 1 shows schematically the principle of operation of conventional filtration (A), in which the angle between the suspension flowlines and the filtration surface is 90°, and cross-flow filtration (B), in which the angle between the suspension flowlines and the filtration surface is 0°. In the diagrams, (1) is the suspension flow, (2) is the filtration surface and (3) is the flow of the liquid phase that has passed through the filtration surface.

The process according to the invention may be a batch process or a continuous process. Preferably, the process according to the invention is a continuous process.

The term "continuous process" is understood to mean a process in which all the steps are carried out continuously, as opposed to a batch process in which one or more steps are not carried out continuously.

The process according to the invention is advantageously carried out in a medium comprising carbon dioxide in the liquid or supercritical state. Preferably, the process according to the invention is carried out in a medium comprising carbon dioxide in the supercritical state.

According to a first preferred variant, the process according to the invention is characterized in that one step involving cross-flow filtration is a step of concentrating the suspension withdrawn from the polymerization medium (suspension A) in order to obtain a concentrated suspension (suspension B).

The expression "suspension withdrawn from the polymerization medium (suspension A)" is understood for the purpose of the present invention to mean a suspension in the form when it is withdrawn from the polymerization reactor, that is to say consisting of halogenated polymer particles and a fluid phase consisting in particular of carbon dioxide in the liquid or supercritical state, unconverted monomer and unconverted initiator, any additive optionally added during the polymerization step, and possibly by-products of the polymerization.

Any known means for withdrawing a suspension such as suspension A from the polymerization medium may be used.

In the first preferred variant in the process according to the invention, the halogenated polymer particle concentration in suspension A subjected to the cross-flow filtration advantageously does not exceed 500, preferably 450, and more preferably 350 $cm^3$ of particles per liter of suspension.

In the first preferred variant in the process according to the invention, the halogenated polymer particle concentration in suspension A subjected to the cross-flow filtration is greater than 0, preferably not less than 10, and more preferably not less than 20 $cm^3$ of particles per liter of suspension.

The expression "halogenated polymer particle concentration in a suspension", is understood to mean the ratio of the volume occupied by all of the particles present in the suspension, expressed in $cm^3$, to the total volume of this suspension, expressed in liters. The volume occupied by a particle is its external volume, that is to say the sum of the volume occupied by the polymeric material and of the volume of the porosity internal to the particle, which is possibly occupied by a gaseous, liquid or supercritical fluid. Knowing the density of the polymeric material ($D_p$ in $g/cm^3$) and the internal porosity of the polymer particles ($P_p$ in $cm^3/g$), it is possible to express the halogenated polymer particle concentration in a suspension in $cm^3$ per liter ($C_v$) from this same concentration expressed in g per liter ($C_m$) by the equation $C_v = C_m (1/D_p + P_p)$.

In the first preferred variant of the process according to the invention, suspension A subjected to the cross-flow filtration is advantageously at a temperature of at least −56° C., preferably at least −45° C., and more preferably at least −30° C. Advantageously, suspension A subjected to the cross-flow filtration is at a temperature of at most 200° C., preferably at most 175° C., and particularly preferably at most 150° C.

In the first preferred variant of the process according to the invention, suspension A subjected to the cross-flow filtration is advantageously at a pressure close to the pressure which the suspension is at in the polymerization reactor.

Advantageously, suspension A subjected to the cross-flow filtration is at a pressure of at least 5 bar, preferably at least 35 bar, and particularly preferably at least 40 bar. Advantageously, suspension A subjected to the cross-flow filtration is at a pressure of at most 3000 bar, preferably at most 700 bar, and particularly preferably at most 500 bar.

The expression "concentrated suspension (suspension B)", is intended for the purpose of the invention to mean the suspension obtained after the step of concentrating suspension A by cross-flow filtration, that is to say a suspension consisting of halogenated polymer particles and a fluid phase comprising the same elements as the fluid phase of suspension A, but which is characterized by a higher halogenated polymer particle concentration than that of suspension A, advantageously with at least 25 vol % of particles in addition per liter of suspension B relative to suspension A.

The halogenated polymer particle concentration in suspension B, after the step of concentrating suspension A by cross-flow filtration, advantageously does not exceed 700, preferably 600, and more preferably 500 $cm^3$ of particles per liter of suspension. The halogenated polymer particle concentration in suspension B, after the step of concentrating suspension A by cross-flow filtration, is advantageously greater than 0, preferably at least 20, and particularly preferably at least 40 $cm^3$ of particles per liter of suspension.

In the first variant of the process according to the invention, the flow of the fluid phase passing through the filtration surface during the step of concentrating suspension A, carried out by cross-flow filtration, advantageously does not exceed 100, preferably 50 and more particularly preferably 10 $m^3$ per $m^2$ per hour.

In the first variant of the process according to the invention, the flow of the fluid phase passing through the filtration surface during the step of concentrating suspension A, carried out by cross-flow filtration, is advantageously greater than 0, preferably at least 0.1, and particularly preferably at least 0.3 $m^3$ per $m^2$ per hour.

This fluid phase recovered during the step of concentrating suspension A by cross-flow filtration may advantageously be returned to the polymerization reactor, optionally after a complementary purification step possibly requiring a recompression step.

This fluid phase may also be sent to an automatic analyser for the purpose of monitoring the process according to the invention.

Preferably, prior to the concentration step, suspension A is cooled in a heat exchanger.

The term "heat exchanger" is understood to mean any apparatus for cooling the suspension to a low enough temperature to stop the polymerization reaction. The heat exchanger may be of any known type known to those skilled in the art, such as, for example, a jacketed heat exchanger, a spiral heat exchanger or a multi-tube heat exchanger. Preferably, the heat exchanger is a jacketed heat exchanger.

The temperature of suspension A at the outlet of the heat exchanger is advantageously at least −56° C., preferably at least −45° C., and most particularly preferably at least −30° C. The temperature of suspension A at the outlet of the heat exchanger is advantageously at most 170° C., preferably at most 145° C., and particularly preferably at most 120° C.

Particularly preferably, the step of concentrating suspension A in order to obtain suspension B is followed by at least one step of purifying suspension B involving cross-flow filtration.

The step of purifying suspension B is preferably carried out by adding an auxiliary fluid.

The auxiliary fluid used for purifying suspension B preferably consists of fresh or recycled carbon dioxide or a mixture of fresh or recycled monomers and carbon dioxide. Particularly preferably, the auxiliary fluid consists of a mixture of fresh or recycled monomers and carbon dioxide. Most particularly preferably, the auxiliary fluid consists of a mixture of recycled monomers and carbon dioxide.

The auxiliary fluid may be added to suspension B before it enters the cross-flow filtration device or directly into the cross-flow filtration device. Preferably, the auxiliary fluid is added to suspension B before it enters the cross-flow filtration device.

The concentration of suspension B diluted by the auxiliary fluid and subjected to cross-flow filtration is advantageously less than 50% of the concentration of suspension B undiluted by the auxiliary fluid.

The halogenated polymer particle concentration in suspension B, diluted by the auxiliary fluid and subjected to cross-flow filtration advantageously does not exceed 350, preferably 300, and particularly preferably 250 $cm^3$ of particles per liter of suspension. The halogenated polymer particle concentration in suspension B, diluted by the auxiliary fluid and subjected to cross-flow filtration is advantageously greater than 0, preferably at least 10, and particularly preferably at least 20 $cm^3$ of particles per liter of suspension.

The halogenated polymer particle concentration in suspension B, after a purification step involving cross-flow filtration is advantageously similar to the halogenated polymer particle concentration in suspension B, after the step of concentrating suspension A.

In the first variant of the process according to the invention, the flow of the fluid phase passing through the filtration surface during the step of purifying suspension B, carried out by cross-flow filtration, is advantageously similar to that of the fluid phase passing through the filtration surface during the step of concentrating suspension A, again carried out by cross-flow filtration and as described above.

The fluid phase recovered during the step of purifying suspension B by cross-flow filtration may advantageously be returned to the polymerization reactor or used as auxiliary fluid, optionally after a complementary purification step possibly requiring a recompression step.

This fluid phase may also be sent to an automatic analyser for the purpose of monitoring the process according to the invention.

Particularly preferably, the step of concentrating suspension A in order to obtain suspension B is followed by several purification steps involving cross-flow filtration one after another with countercurrent washing, as defined in the second preferred variant below.

According to a second preferred variant, the process according to the invention is characterized in that it includes at least one step of purifying a suspension containing the formed polymer (suspension C) involving cross-flow filtration.

The expression "suspension containing the formed polymer (suspension C)", is understood for the purpose of the present invention to mean a suspension consisting of halogenated polymer particles and a fluid phase consisting especially of carbon dioxide in the liquid or supercritical state, unconverted monomer and unconverted initiator, the additive optionally added during the polymerization step, and possibly by-products of polymerization.

Suspension C may be a suspension withdrawn from the polymerization medium in the form that it has when it is withdrawn from the polymerization reactor (suspension A defined above) or this same suspension having been subjected to a prior concentration step not involving cross-flow filtration. Suspension C may be cooled in a heat exchanger prior to the first purification step.

The concentration step not involving cross-flow filtration may be carried out by sedimentation, optionally combined with centrifugation. Any suitable device may be used, with a particular preference for a cyclone-type device.

Preferably, the step of purifying suspension C is carried out by adding an auxiliary fluid.

The auxiliary fluid used to purify suspension C preferably consists of fresh or recycled carbon dioxide or a mixture of fresh or recycled monomers and carbon dioxide. Particularly preferably, the auxiliary fluid consists of a mixture of fresh or recycled monomers and carbon dioxide. Most particularly preferably, the auxiliary fluid consists of a mixture of recycled monomers and carbon dioxide.

The auxiliary fluid may be added to suspension C before its entry into the cross-flow filtration device or directly into the cross-flow filtration device. Preferably, the auxiliary fluid is added to suspension C before its entry into the cross-flow filtration device.

The halogenated polymer particle concentration in suspension C before the addition of the auxiliary fluid (withdrawn from the polymerization reactor or this same suspension having been subjected to a prior concentration step not involving cross-flow filtration) advantageously does not exceed 500, preferably 450, and particularly preferably 350 $cm^3$ of particles per liter of suspension. The halogenated polymer particle concentration in suspension C before the addition of the auxiliary fluid is advantageously greater than 0, preferably at least 10, and particularly preferably at least 20 $cm^3$ of particles per liter of suspension.

The halogenated polymer particle concentration in suspension C after the addition of the auxiliary fluid preferably does not exceed 250, preferably 225, and particularly preferably 175 cm$^3$ of particles per liter of suspension. The halogenated polymer particle concentration in suspension C after the addition of the auxiliary fluid is advantageously greater than 0, preferably at least 10, and particularly preferably at least 20 cm$^3$ of particles per liter of suspension.

The halogenated polymer particle concentration in suspension C having been subjected to a purification step involving cross-flow filtration advantageously does not exceed 700, preferably 600, and particularly preferably 500 cm$^3$ of particles per liter of suspension. The halogenated polymer particle concentration in suspension C having been subjected to a purification step involving cross-flow filtration is advantageously greater than 0, preferably at least 20, and particularly preferably at least 40 cm$^3$ of particles per liter of suspension.

Particularly preferably, the process according to the second preferred variant is characterized in that it includes several steps of purifying suspension C involving cross-flow filtration one after another with countercurrent washing.

The expression "countercurrent washing" is understood for the purposes of the present invention to mean that the auxiliary fluid is introduced at the last step in the purification of suspension C and that the fluid phase extracted at each of the purification steps is introduced at the preceding purification step.

The halogenated polymer particle concentration in suspension C having been subjected to several purification steps one after another with countercurrent washing involving cross-flow filtration advantageously does not exceed 350, preferably 300 and particularly preferably 250 cm$^3$ of particles per liter of suspension. The halogenated polymer particle concentration in suspension C having been subjected to several purification steps one after another with countercurrent washing involving cross-flow filtration is advantageously greater than 0, preferably at least 10, and particularly preferably at least 20 cm$^3$ of particles per liter of suspension.

In the second preferred variant of the process according to the invention, the pressure of suspension C subjected to cross-flow filtration advantageously does not exceed the pressure of the suspension in the polymerization reactor.

Advantageously, suspension C subjected to cross-flow filtration is at a pressure of at least 5 bar, preferably of at least 35 bar and particularly preferably of at least 40 bar. Advantageously, suspension C subjected to cross-flow filtration is at a pressure of at most 3000 bar, preferably at most 700 bar, and particularly preferably at most 500 bar.

In the second preferred variant of the process according to the invention, suspension C subjected to cross-flow filtration is advantageously at a temperature of at least −56° C., preferably at least −45° C. and particularly preferably at least −30° C. Advantageously, suspension C subjected to cross-flow filtration is at a temperature of at most 200° C., preferably at most 175° C., and particularly preferably at most 150° C.

In the second variant of the process according to the invention, the flow of the fluid phase passing through the filtration surface during purification of suspension C, carried out by cross-flow filtration, advantageously does not exceed 100, preferably 50, and particularly preferably 10 m$^3$ per m per hour.

In the second variant of the process according to the invention, the flow of the fluid phase passing through the filtration surface during purification of suspension C, carried out by cross-flow filtration, is advantageously greater than 0, preferably at least 0.1, and particularly preferably at least 0.3 m$^3$ per m$^2$ per hour.

The fluid phase recovered during the first step of purifying suspension C by cross-flow filtration may advantageously be sent back to the polymerization reactor or used as auxiliary fluid, optionally after a complementary purification step, possibly requiring a recompression step.

Each fluid phase extracted at each of the purification steps may also be sent to an automatic analyser for the purpose of monitoring the process according to the invention.

In a third preferred variant, the process according to the invention is characterized in that it includes a step of withdrawing a portion of the fluid phase of suspension C as defined above involving cross-flow filtration.

In the third preferred variant of the process according to the invention, the halogenated polymer particle concentration in suspension C subjected to cross-flow filtration advantageously does not exceed 500, preferably 450, and particularly preferably 350 cm$^3$ of particles per liter of suspension.

In the third preferred variant of the process according to the invention, the halogenated polymer particle concentration in suspension C subjected to cross-flow filtration is advantageously greater than 0, preferably at least 10, and particularly preferably at least 20 cm$^3$ of particles per liter of suspension.

In the third preferred variant of the process according to the invention, suspension C subjected to cross-flow filtration is advantageously at a temperature of at least −56° C., preferably of at least −45° C. and particularly preferably at least −30° C. Advantageously, suspension C subjected to cross-filtration is at a temperature of at most 200° C., preferably at most 175° C., and particularly preferably at most 150° C.

In the third preferred variant of the process according to the invention, suspension C subjected to cross-flow filtration is advantageously at a pressure close to the pressure which the suspension is at in the polymerization reactor.

Advantageously, suspension C subjected to cross-flow filtration is at a pressure of at least 5 bar, preferably at least 35 bar and particularly preferably at least 40 bar. Advantageously, suspension C subjected to cross-flow filtration is at a pressure of at most 3000 bar, preferably at most 700 bar, and particularly preferably at most 500 bar.

In the third preferred variant of the process according to the invention, the flow of the fluid phase passing through the filtration surface during the step of withdrawing a portion of the fluid phase of suspension C, carried out by cross-flow filtration, is advantageously greater than 0, preferably at least 0.1, and particularly preferably at least 0.3 m$^3$ per m$^2$ per hour.

In the third preferred variant of the process according to the invention, the flow of the liquid phase passing through the filtration surface during the step of withdrawing a portion of the fluid phase of suspension C, carried out by cross-flow filtration, advantageously does not exceed 100, preferably 50, and particularly preferably 10 m$^3$ per m$^2$ per hour.

The halogenated polymer particle concentration in suspension C after the step of withdrawing the fluid phase involving cross-flow filtration is approximately identical to that of suspension C before this step.

Thus, the halogenated polymer particle concentration in suspension C after the step of withdrawing the fluid phase involving cross-flow filtration advantageously does not exceed 500, preferably 450, and particularly preferably 350 cm$^3$ of particles per liter of suspension. The halogenated polymer particle concentration in suspension C after the step of withdrawing the fluid phase involving cross-flow filtration is advantageously greater than 0, preferably at least 10 and particularly preferably at least 20 cm$^3$ of particles per liter of suspension.

Preferably, the fluid phase thus collected during the withdrawal step is sent to an automatic analyser for the purpose of monitoring the process according to the invention.

The term "automatic analyser" is understood to mean any automatic analyser for analysing the content of the fluid phase in order to determine useful properties for the purpose of monitoring the process according to the invention. The automatic analyser may be of any type known to those skilled in the art, such as a chromatograph, an infrared spectrometer, a titration apparatus or a UV spectrometer.

The expression "radical polymerization of halogenated monomers" is underside to mean both the homopolymerization of halogenated monomers and their copolymerization with other ethylenically unsaturated monomers that can be polymerized by radical means, for the purpose of obtaining halogenated polymers.

The expression "halogenated polymers" is understood to mean both homopolymers and copolymers of halogenated monomers. Among these, mention in particular may be made of the following: homopolymers of halogenated monomers, such as fluoroolefins, for example, vinylidene fluoride, vinyl fluoride, trifluoroethylene, tetrafluoroethylene, chlorotrifluoroethylene and hexafluoropropylene; fluoroacrylates; fluorinated vinyl ethers, for example, perfluorinated vinyl ethers carrying perfluoroalkyl groups containing 1 to 6 carbon atoms; vinyl chloride and vinylidene chloride. Mention may also be made of the copolymers that these halogenated monomers form together and copolymers of one of these halogenated monomers with another ethylenically unsaturated monomer such as olefins, for example, ethylene, propylene; styrene derivatives and styrene; halogenated olefins; vinyl ethers; vinyl esters such as vinyl acetate; acrylic acids, esters, nitriles and amides and methacrylic acids, esters, nitriles and amides.

Preferably, the process according to the invention is characterized in that the halogenated polymers obtained are fluorine-containing polymers.

The term "fluorine-containing polymers" is understood to mean both homopolymers and copolymers of fluorine-containing monomers. Among these, mention may be made in particular of the following: homopolymers of halogenated monomers, such as fluoroolefins, such as vinylidene fluoride, vinyl fluoride, trifluoroethylene, le tetrafluoroethylene, chlorotrifluoroethylene and hexafluoropropylene; fluoroacrylates and fluorinated vinyl ethers, for example, perfluorinated vinyl ethers carrying perfluoroalkyl groups containing 1 to 6 carbon atoms. Mention may also be made of the copolymers that these fluorine-containing monomers form, together such as copolymers of vinylidene fluoride with another fluorinated monomer as defined above, and copolymers of one of the abovementioned fluorine-containing monomers with another ethylenically unsaturated monomer such as olefins, for example, ethylene, propylene; styrene derivatives and styrene; halogenated olefins; vinyl ethers; vinyl esters such as vinyl acetate; acrylic acids, esters, nitriles and amides and methacrylic acids, esters, nitriles and amides.

Particularly preferably, the process according to the invention is characterized in that the halogenated polymers obtained are vinylidene fluoride polymers.

The term "vinylidene fluoride polymers" is understood to mean both vinylidene fluoride homopolymers and copolymers of vinylidene with other ethylenically unsaturated monomers, whether these are fluorinated (fluorolefins, for example, vinyl fluoride, trifluoroethylene, tetrafluoroethylene, chlorotrifluoroethylene, hexafluoropropylene; fluoroacrylates; fluorinated vinyl ethers such as perfluorinated vinyl ethers carrying perfluoroalkyl groups containing 1 to 6 carbon atoms) or not fluorinated (olefins such as ethylene, propylene; styrene derivatives and styrene; halogenated olefins; vinyl ethers; vinyl esters such as vinyl acetate; acrylic acids, esters, nitriles and amides; methacrylic acids, esters, nitriles and amides). Vinylidene fluoride homopolymers and copolymers of vinylidene fluoride with a fluorinated comonomer are particularly preferred. Vinylidene fluoride homopolymers and vinylidene fludride/chlorotrifluoroethylene copolymers and vinylidene fluoride/hexafluoropropylene copolymers are particularly preferred. The copolymers obtained preferably contain at least about 75% by weight of monomeric units derived from vinylidene fluoride.

Advantageously, the polymerization step of the process according to the invention is carried out in one reactor or in several reactors in series. When the polymerization step is carried out in several reactors in series, the step or steps involving cross-flow filtration may be performed between the reactors or at the outlet of the final reactor. Preferably, the step or steps involving cross-flow filtration are performed at the outlet of the final reactor.

The polymerization step of the process according to the present invention may be carried out in any type of suitable reactor chosen from mechanically stirred tank reactors, tank reactors with an external circulation loop or tube reactors with a recirculation loop. These reactors may advantageously be equipped with a heating system and/or with a cooling system for controlling the temperature.

The expression "mechanically stirred tank reactor" is understood to mean a tank reactor provided with a mixing device used for homogenizing the reaction medium, such as blade stirrers, propeller stirrers or turbine agitators. In this case, the temperature of the reactor will preferably be controlled by a heat exchange system consisting of a jacket or a heat exchanger internal to the reactor, conveying a heat-transfer fluid.

The expression "tank reactor with an external circulation loop" is understood to mean a tank reactor provided with a circulation circuit external to the tank serving to homogenize the reaction mixture and possibly to thermally control the reactor by a heat exchanger placed in this circuit, such as a multitube exchanger or jacketed tube exchanger, or else a spiral exchanger placed in the circuit, the circulation possibly being provided by a mechanical device, such as a pump.

The expression "tube reactor having a recirculation loop" is understood to mean a reactor consisting of a tube mounted in the circuit, inside which tube the reaction mixture circulates, the heat exchange necessary for thermal control taking place across the wall of the tube, for example by means of ajacket inside which a heat-transfer fluid circulates. The heat released may be used to heat the reactants and the cosolvents downstream and/or upstream of the reactor in question.

Advantageously, the polymerization temperature is at least −50° C., preferably at least −20° C. and particularly preferably at least 0° C. Advantageously, the temperature is at most 200° C., preferably at most 175° C. and particularly preferably at most 150° C.

Advantageously, the polymerization pressure is at least 5 bar, preferably at least 35 bar and particularly preferably at least 40 bar. Advantageously, the pressure is at most 3000 bar, preferably at most 700 bar and particularly preferably at most 500 bar.

The polymerization step of the process according to the invention may be carried out by radical means and customarily involves the use of one or more initiators, the nature, number and concentration of which may also be chosen according to the requirements. As initiators useful within the context of the present invention, it is possible to use any appropriate radical initiator, in particular an organic radical initiator chosen for example from the following : peroxides, such as dimethyl peroxydicarbonate, diethyl peroxydicarbonate, diacetyl peroxydicarbonate, dicyclohexyl peroxydicarbonate, di(2-ethylhexyl)peroxydicarbonate, t-butyl peroxyisopropylcarbonate, t-butyl peroxy-n-decanoate, t-butyl peroxyacetate, t-butyl peroxypivalate, t-amyl peroxypivalate, di-t-butyl peroxide, dibenzoyl peroxide, dioctanoyl peroxide, dilauroyl peroxide, dicumyl peroxide, di-t-amyl peroxide, t-butyl per-2-ethylhexanoate, t-butyl peroxymaleate, cumene hydroperoxide, pinane hydroperoxide and p-menthane hydroperoxide; nitrites, such as 2,2'-azobis(methoxy-2,4-dimethylvaleronitrile) and 2,2'-azobis(2,4-dimethylvaleronitrile); and similar compounds.

The concentration of initiators for the polymerization step is advantageously between $5 \times 10^{-5}$ mol/liter and 0.1 mol/liter.

The polymerization step of the process of the present invention may be optionally carried out in the presence of one or more surfactants and one or more dispersants. Any suitable surfactant or dispersant known to those skilled in the art may be employed.

The polymerization step of the process according to the invention may optionally be carried out in the presence of additives other than the abovementioned additives (i.e. initiators, surfactants and dispersants) for improving the implementation of the process and/or the characteristics of the resulting polymer. Examples of other additives are chain transfer agents, anti-fouling agents, anti-static agents and co-solvents.

The process for preparing halogenated polymers according to the invention, apart from the polymerization step and the step(s) involving cross-flow filtration, may include other steps such as one or more complementary steps of purification, low-pressure filtration, additive addition or granulation of the polymer formed.

The step or steps involving cross-flow filtration of the process according to the invention may be carried out by means of any cross-flow filtration device. Good results have been obtained when these various steps are carried out by means of a cross-flow filtration device consisting of at least one filter tube housed in an outer jacket, the tube and the jacket being kept a certain distance from each other by means of two parts which are located at their ends and to which they are fixed.

The invention also relates to this device for implementing the process according to the invention.

The cross-flow filtration device according to the invention may advantageously consist of at most 10, preferably at most 5 and particularly preferably at most 3 filter tubes. Most particularly preferably, it consists of a single filter tube housed in an outer jacket.

Advantageously, the filter tube is made of a material chosen from sintered metal powders, metal oxides, carbon, ceramics, metal membranes and supported fabrics.

Preferably, the filter tube is made of a material chosen from sintered metal powders. Among sintered metal powders, mention may be made of sintered metal powders composed of a sintered metal such as titanium or a sintered alloy, such as stainless steel, bronze and nickel-based alloys. Particularly preferably, the filter tube is made of sintered stainless steel.

The mean pore diameter of the filter tube is preferably at least 0.005 μm and particularly preferably at least 0.5 μm. The mean pore diameter of the filter tube is preferably at most 200 μm and particularly preferably at most 20 μm.

The inner surface of the filter tube may advantageously be treated by an anti-fouling agent.

The outer jacket and the two parts located at the ends of the tube and of the jacket are advantageously made of a material chosen from metals and alloys. Preferably, the outer jacket and the two parts located at the ends of the tube and of the jacket are made of a material chosen from alloys, such as stainless steel and nickel-based alloys, either through the thickness or as a coating. Particularly preferably, the outer jacket and the two parts are made of stainless steel.

Preferably, the device according to the invention is characterized in that a seal is placed between the filter tube and the parts located at the ends of the filter tube and of the outerjacket.

The seal placed between the filter tube and the parts located at the ends of the tube and of the outer jacket is advantageously made of a material chosen from metallic materials, plastics, elastomeric materials and hybrid materials containing the abovementioned materials and optionally filled with fibres.

Among these materials, mention may be made of the following: metals, such as iron, copper, aluminium, silver and nickel, whether pure or alloyed; polymeric materials, such as polymers of the silicone type, polyolefins, such as polyethylene, elastomeric polymers, of the EPDM, NBR, HNBR and CR type, and halogenated polymers, such as polyvinyl chloride, polyvinylidene fluoride, polytetrafluoroethylene and fluoroelastomers. Preferably, the seal placed between the filter tube and the parts located at the ends of the tube and of the outer jacket is made of polytetrafluoroethylene.

Particularly preferably, the device according to the invention is characterized in that advantageously at least one, and preferably only one, tube (called a "lateral tube") is connected laterally to the outer jacket.

The lateral tube advantageously is made of the same material as the outer jacket and the two parts located at the ends of the filter tube and of the outer jacket.

The position of the lateral tube relative to the outer jacket is not critical. The lateral tube is preferably placed in the lower portion of the outer jacket.

Advantageously, the device according to the invention is designed to filter suspensions under high pressures. Preferably the device according to the invention is designed to filter suspensions under a pressure of at least 5 bar, particularly preferably at least 35 bar and most particularly preferably at least 40 bar. Preferably, the device according to the invention is designed to filter suspensions under a pressure of at most 3000 bar, particularly preferably at most 700 bar and most particularly preferably at most 500 bar.

Figure 2:
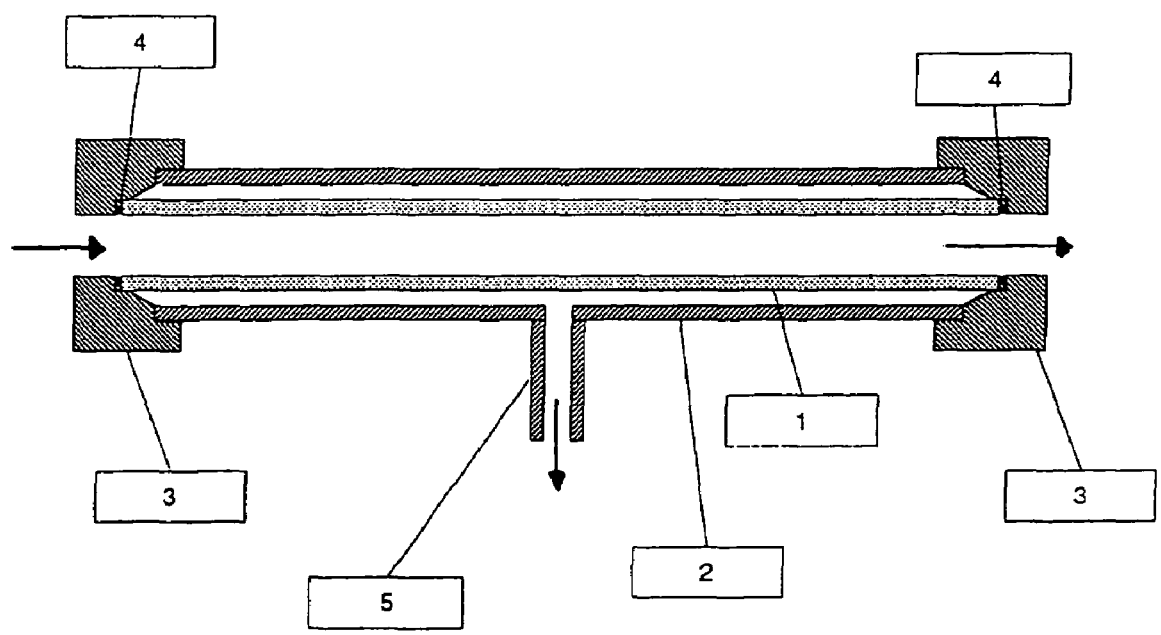
FIG. 2 represents a schematic illustration of the cross-flow filtration device according to the present invention, which is designed to filter suspensions under high pressures.

Features and details of the device according to the invention will become apparent from the following description of FIG. 2, which shows schematically one particular embodiment of the device according to the invention.

The device shown in FIG. 2 comprises a filter tube 1 housed in an outer jacket 2. The tube and the jacket are kept at a certain distance from each other by means of two parts 3 which are located at the ends of the tube and of the jacket and to which these are fixed. A seal 4 is placed between the filter tube 1 and the parts 3. A lateral tube 5 is connected laterally to the outer jacket 2.

When the device according to the invention is used in the process according to the invention, the suspension subjected to cross-flow filtration advantageously flows through the device according to the invention inside the filter tube and the fluid phase separated by cross-flow filtration through the filter tube flows via the lateral tube.

Compared with the processes of the prior art in which the polymer suspension is discharged directly by complete decompression to atmospheric pressure or by flash decompression, the process according to the invention makes it possible to save energy by limiting the cost of mechanical recompression and/or liquefaction incurred by recycling the carbon dioxide and unconverted monomers.

Compared with the processes according to the prior art in which the separation of the polymer formed is carried out by accumulation in a filtration device, the process and the device according to the invention have the advantage of preventing the stagnation of the polymer formed with the inherent difficulties and risks (difficulty of dislodging the polymer from the filter, complete or partial blockage of the filter, long residence time of certain fractions of the polymer, perturbations of the polymerization and separation conditions) and are characterized by a relatively lower cost.

The process according to the invention also makes it possible to obtain halogenated polymers that are stripped of their impurities and require no subsequent purification when being processed. Finally the process according to the invention makes it possible to withdraw the fluid phase extracted from the polymer suspension for the purpose of monitoring the process.

EXAMPLES

The examples that follow are intended to illustrate the process and the device according to the invention without thereby limiting the scope thereof.

Cross-flow Filtration Device

The cross-flow filtration device used in the following example was produced from a filter tube made of sintered stainless steel, the pores of which had a mean diameter of 3 μm, having an inside diameter of 6 mm, and outside diameter of 10 mm, a length of 185 mm and a filtration area of 35 $cm^2$, calculated on the basis of the inside diameter. This filter tube was housed in an outer jacket consisting of a tube made of 316 L stainless steel with an outside diameter of 17.5 mm and an inside diameter of 12.0 mm. The filter tube and the outer-jacket were kept apart by a distance of 1 mm by means of two parts located at the ends of the filter tube and the outer jacket, to which parts the filter tube and the outerjacket were fixed. A polytetrafluoroethylene seal was placed between the filter tube and the parts located at the ends. These parts located at the ends also allowed the connection, along the axis of the filter tube, of the pipes for the inflow of the suspension coming from the reactor and for the outflow of the suspension towards the collection device. These were 304 stainless steel pipes with an outside diameter of 14.3 mm and an inside diameter of 6.4 mm. Connected to the outer jacket was a lateral tube with an outside diameter of 6.35 mm and an inside diameter of 2.4 mm.

Preparation of a Vinylidene Fluoride Polymer

Carbon dioxide, vinylidene fluoride and an initiator solution in a polymerization-inert solvent, with a concentration of 100 g of diethyl peroxydicarbonate per kg of solution, were introduced into a mechanically stirred reactor with a volume of two liters.

The polymerization conditions were the following:
polymerization pressure: 300 bar;
polymerization temperature: 53° C.;
reactor inlet carbon dioxide flow rate: 2.56 kg/h;
reactor inlet vinylidene fluoride flow rate: 0.78 kg/h;
reactor inlet initiator solution flow rate: 38.6 g/h.

The suspension containing solid polyvinylidene fluoride particles and a fluid phase consisting of carbon dioxide, unreacted vinylidene fluoride and initiator, and also solvent for the initiator and by-products of the polymerization, leaving the reactor at a temperature of 53° C., with a flow rate of 3.38 kg/h and a halogenated polymer particle concentration of 36 $cm^3$ of particles (or 13 g of polymer) per liter of suspension and a pressure of 300 bar, was cooled to 22° C. in a jacketed exchanger before going through the device described above.

The flux of the fluid phase flowing through the filter device was 0.6 $m^3/m^2h$. The flow rate of the suspension leaving the tube was 1.38 kg/h. The halogenated polymer particle concentration of this suspension was 102 $cm^3$ of particles (or 37 g of polymer) per liter of suspension.

The pressure drop variation was imperceptible for the duration of the trial (6 hours). Microscopic examination of the external surface of the filter tube was unable to detect any polymer particle having passed through the latter.

The cross-flow filtration made it possible to collect a fluid phase representing 60% of the carbon dioxide and of the unconverted reactants, free of polymer, at a pressure above 299 bar. This fluid phase was available for being recycled back to the polymerization reactor with a low recompression cost and/or for being sent to an automatic analyser in order to be analysed so as to monitor the process according to the invention. The polymer suspension was discharged and the polymer recovered in a low-pressure filter.

Obviously, numerous modifications and variations of the present invention are possible in light of the above teachings. It is therefore to be understood that within the scope of the appended claims, the invention may be practiced otherwise than as specifically described herein.

The invention claimed is:

1. A process for preparing a halogenated polymer in a polymerization medium comprising liquid or supercritical carbon dioxide, said process comprising the radical polymerization of at least one halogenated monomer and cross-flow filtration of a suspension of halogenated polymer particles in a fluid phase comprising liquid or supercritical carbon dioxide, wherein the suspension of polymer particles in a fluid phase is withdrawn from the polymerization medium (suspension A) and subjected to cross flow filtration in order to obtain a concentrated suspension (suspension B), and wherein said process further comprises at least one of a), b), and c) as follows:
   a) prior to concentration by cross flow filtration, suspension A is cooled in a heat exchanger;
   b) purification of concentrated suspension B by cross-flow filtration;
   c) suspension A is concentrated by a method not involving cross-flow filtration prior to being subjected to cross flow filtration in order to obtain suspension B.

2. The process according to claim 1, wherein, prior to concentration by cross flow filtration, suspension A is cooled in a heat exchanger.

3. The process according to claim 1, comprising the purification of concentrated suspension B by cross-flow filtration.

4. The process according to claim 1, wherein suspension A is concentrated by a method not involving cross-flow filtration prior to being subjected to cross flow filtration in order to obtain suspension B.

5. The process according to claim 4, wherein an auxiliary fluid is added to suspension A prior to being concentrated by a method not involving cross-flow filtration.

6. The process according to claim 5, wherein the process further comprises purifying suspension B by subjecting suspension B to one or more successive countercurrent washing and cross-flow filtration cycles.

7. The process according to claim 1, said process further comprising withdrawing a portion of the fluid phase of suspension A.

8. The process according to claim 1, wherein the halogenated polymer is a fluorine-containing polymer.

9. A process for preparing a halogenated polymer in a polymerization medium comprising liquid or supercritical carbon dioxide, said process comprising the radical polymerization of at least one halogenated monomer and cross-flow filtration of a suspension of halogenated polymer particles in a fluid phase comprising liquid or supercritical carbon dioxide, wherein cross-flow filtration is conducted in a device comprising at least one filter tube housed in an outer jacket, the filter tube and the outer jacket being kept a fixed distance from each other by two parts which are located at their ends and to which they are fixed.

10. The process according to claim 9, wherein said device comprises a single filter tube.

11. The process according to claim 9, wherein a seal is located between the filter tube and the parts located at the ends of the filter tube and of the outer jacket.

12. The process according to claim 11, wherein the seal is made of polytetrafluoroethylene.

13. The process according to claim 9, wherein at least one tube is connected laterally to the outer jacket.

14. The process according to claim 13, said device including a single lateral tube.

15. The process according to claim 1, wherein the polymerization medium comprises liquid carbon dioxide.

16. The process according to claim 1, wherein the polymerization medium comprises supercritical carbon dioxide.

17. The process according to claim 9, wherein the polymerization medium comprises liquid carbon dioxide.

18. The process according to claim 9, wherein the polymerization medium comprises supercritical carbon dioxide.

* * * * *